Feb. 6, 1962 R. M. WALKER ETAL 3,020,489

CRYOGENIC DEVICE

Filed Dec. 24, 1958 2 Sheets-Sheet 1

INVENTORS
ROBERT M. WALKER
EUGENE S. SCHLIG

BY Frederick S. Smyth
ATTORNEY

Feb. 6, 1962 R. M. WALKER ETAL 3,020,489

CRYOGENIC DEVICE

Filed Dec. 24, 1958 2 Sheets-Sheet 2

United States Patent Office 3,020,489
Patented Feb. 6, 1962

3,020,489

CRYOGENIC DEVICE

Robert M. Walker, Closter, N.J., and Eugene S. Schlig, New York, N.Y., assignors to International Business Machines Corporation, New York, N.Y., a corporation of New York Filed Dec. 24, 1958, Ser. No. 782,706
9 Claims. (Cl. 330—62)

This invention relates to cryogenic devices and more particularly to an improved cryogenic amplifier.

It has been known that the resistance of various materials is a function of temperature and that certain materials exhibit a decreasing resistance with decreasing temperature until a critical temperature is reached at which point the resistance of the material drops to zero and the material becomes superconducting. In general, each of the materials having this property has a different critical temperature and below this critical temperature the zero resistance or superconducting state remains. Additionally, it has been found that when a material is subjected to a magnetic field, its critical temperature is thereby lowered. Thus, by a proper choice of material, temperature, and magnetic field, it is possible, at a particular temperature, to maintain the material in either its superconducting or normal resistive state depending solely on whether the magnetic field is applied to the material or not.

By means of the hereinabove described principles there have been fabricated various electrical devices, including amplifiers, which consist, basically, of a plurality of gate elements and a plurality of control elements so arranged that a current through a control element applies to a magnetic field to an associated gate element to cause the gate element to change from the superconducting to the resistive state. Generally, amplifiers have been constructed by applying a fixed magnetic field to a gate element to bias this element at a particular operating point in the transition region between the superconducting and resistive states. The magnitude of this constant field is selected so that, at the operating temperature of the circuit, the gate element is no longer superconducting, yet the applied field is not sufficient to drive the gate element fully into the normal resistive state. An associated control element is then caused to vary the resultant magnetic field applied to the gate element, thereby varying the resistance of the gate element.

Cryogenic amplifiers, according to the prior art, have operated with a constant magnetic field applied to the gate elements in order to bias these elements in the transition region between the superconductive and normal resistive states. However, the gate elements have been found to be extremely sensitive to slight changes in the applied magnetic field and it has been difficult to maintain, in an operating amplifier, a constant magnetic field, thereby obtaining a fixed bias point in the transition region.

The subject invention solves this problem by providing a novel cryogenic amplifier circuit wherein the current conducted by a gate element is also applied through a control element associated with the gate element to bias the latter at a selected operating point in the transition region. In this way, more stable operating conditions are maintained. Additionally, the self-biased gate element of this embodiment of the invention exhibits a more linear dynamic transition characteristic than a fixed-biased gate element. This amplifier embodiment of the invention also includes a circuit means for connecting a first cryogenic amplifier stage in cascade with a second cryogenic amplifier stage in such a way that the current used to bias the first stage is effectively cancelled in the input of the second stage in the absence of an applied signal. Using this arrangement, it is possible to cascade a plurality of amplifier stages while employing only a single current source without additional connections to each stage.

An object of the invention is to provide an improved cryogenic amplifier.

Another object of the invention is to provide a more linear cryogenic amplifier.

Yet another object of the invention is to provide a cryogenic amplifier of improved stability.

Still another object of the invention is to provide novel circuits usable in single and multi-stage cryogenic amplifiers.

A further object of the invention is to provide a self-biased cryogenic amplifier.

A still further object of the invention is to provide a self-biased multi-stage cryogenic amplifier wherein the bias current of a first stage does not affect the operating point of a second stage in the absence of an applied signal.

Other objects of the invention will be pointed out in the following description and claims and illustrated in the accompanying drawings which disclose by way of example, the principle of the invention and the best mode which has been contemplated of applying that principle.

Figure 2:
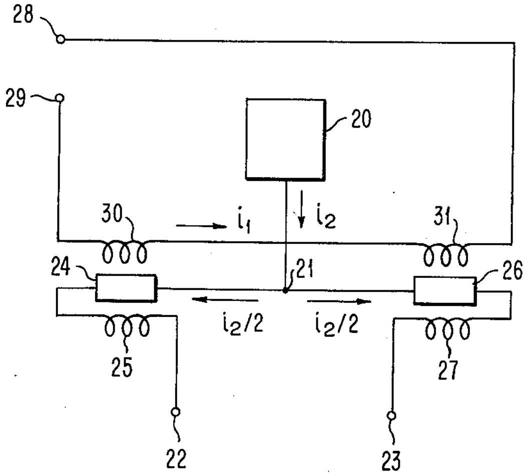
FIG. 2 is a schematic diagram of a simplified form of the invention.
Figures 3A, 3B:
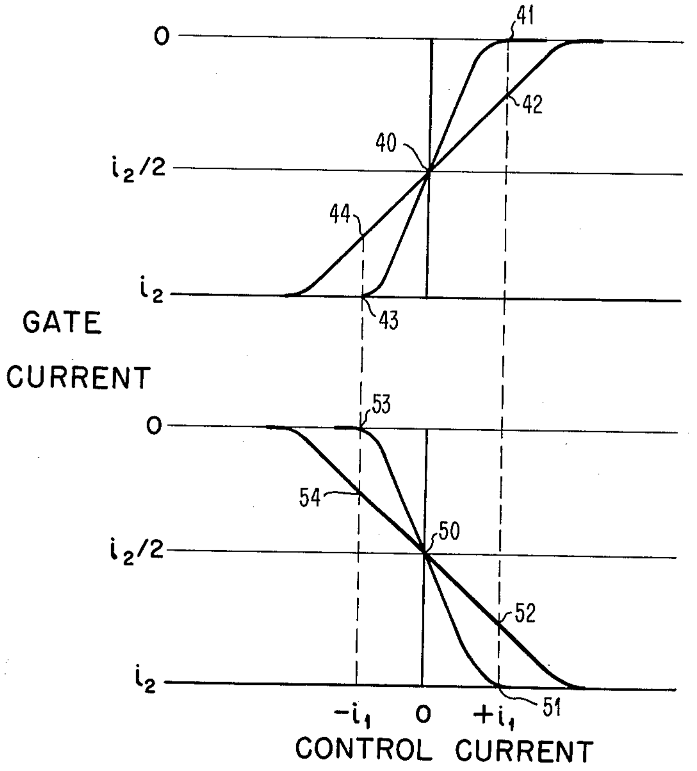

FIG. 3*a* is a curve illustrating the dynamic transition characteristics of one of the gate elements in the circuit of FIG. 2.

FIG. 3*b* is a curve illustrating the dynamic transition characteristics of the other gate element in the circuit of FIG. 2.

Figure 4:
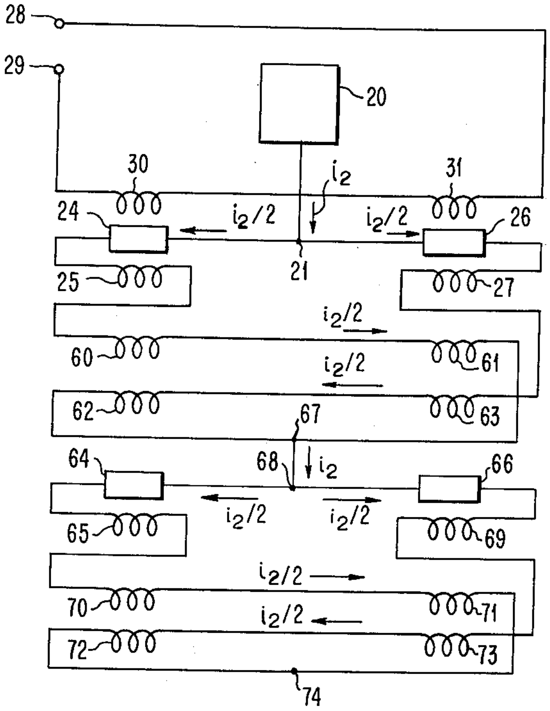

FIG. 4 is a schematic diagram of a multi-stage amplifier of the invention.

Most known superconductor materials have critical temperatures close to absolute zero, and for this reason, liquid helium is the preferred medium for obtaining a suitable operating temperature. It is desirable that the material chosen for the gate elements, the elements whose resistance is to be varied, have a critical temperature slightly above the operating temperature so that a relatively small magnetic field converts the material from its superconductive to the normal resistive state. Conversely, the material employed for the control elements should have a critical temperature sufficiently above the operating temperature so that the control elements remain superconducting for all values of magnetic fields that may be encountered. In this manner, there is no power loss in these control elements, and no local temperature gradients are produced by heat generated therein. For these reasons, materials such as tantalum and tin are used as gate elements, having critical temperatures above 4.4 and 3.7 degrees Kelvin, respectively, and materials such as niobium and lead are used as control elements having critical temperatures of about 8.0 and 7.2 degrees Kelvin, respectively.

Figure 1:
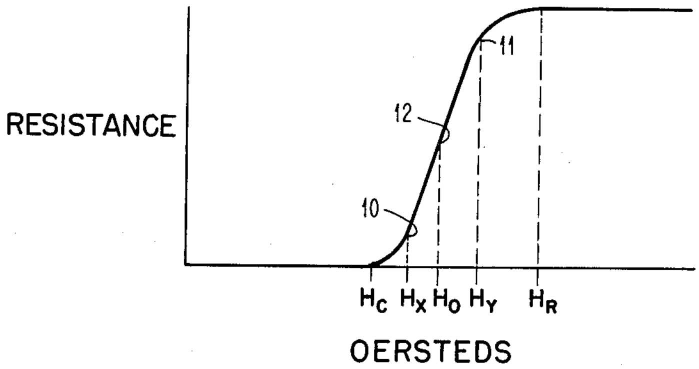
FIG. 1 illustrates the transition characteristic of a superconductive material.

Referring now to the drawings, a transition curve of a superconductor is illustrated in FIG. 1 which shows, for a constant temperature, the variation of resistance as a function of an applied magnetic field. As the field is increased from zero, the material remains superconducting until the value $Hc$ is reached, at which point resistance appears. As the field is further increased, the resistance continues to increase until at the value $Hr$, the normal resistance of the material is obtained, and this resistance remains relatively constant as the applied field is still further increased. It can be seen in FIG. 1 that the variation of resistance is essentially a linear function of the applied magnetic field between points 10 and 11.

When a first magnetic field of a value, by way of example, H*o*, is applied to the superconductor, the resistance is that shown at 12 in FIG. 1. When a second time varying magnetic field is applied so that the resultant field operating on the superconductor is the vector sum of the first and second fields, the time variation of the resistance of the superconductor is a linear representation of the second field, provided the resultant field does not exceed the limits H*x* and H*y*. Since the current required to produce the time varying field can be less than the current that can be controlled by the varying resistance, amplification is possible.

FIG. 2 illustrates a linear push-pull cryogenic amplifier employing the self-biasing feature of the invention. A constant current source 20 delivers a current $i_2$ to junction 21 and thence through a pair of parallel paths to a pair of terminals 22 and 23. The first path includes gate element 24, control element 25, and terminal 22, and the second path includes gate element 26, control element 27, and terminal 23. Terminals 22 and 23 are normally connected to the input of a utilization device which may be another cryogenic or electronic device, not shown, but for the purpose of understanding the operation of the amplifier of FIG 2, these terminals can be considered to be connected together through a superconducting network to the current return terminal of current source 20. Gate elements 24 and 26 shown in FIG. 2 may be a wire, strip, or ribbon of superconductive material. Additionally, control elements 25 and 27 may be a wire, coil, strip, or ribbon of superconductive material adapted to magnetically modify the resistance of an associated gate element. As an aid in understanding the operation of the invention, however, the control elements will hereinafter be described as control coils unless a specific embodiment of the invention is being described.

In order to clarify the following analysis, all gate elements will be assumed to have identical characteristics and to be biased at the mid-point of the transition curve. As will be hereinafter understood, however, any desired bias point may be selected.

From the symmetry of the circuit shown in FIG. 2, it is expected that the current $i_2$ divides evenly at junction 21 and a current $i_{2/2}$ flows in each of the parallel paths. That this is true, can be seen from the following analysis. Assume, initially, that a current greater than $i_{2/2}$ flows through gate element 24, that is, the current divides at junction 21 so that a current, $i_{2/2}+\Delta i$, flows through gate element 24 and a current, $i_{2/2}-\Delta i$, flows through gate element 26. These currents, additionally, flow through control coils 25 and 27, respectively, whereby gate element 24 is caused to be more resistive than gate element 26. However, from electrical circuit theory, it is known that the current in parallel paths divides inversely as the resistance in the paths, that is, the path affording the greater resistance conducts the least current. Therefore, a portion of the excess current through gate element 24 and control coil 25 is shifted through gate element 26 and control coil 27 until the resistance in each of the parallel paths is equal. This condition is obtained, when the current flowing through control coil 25 is equal to the current flowing through control coil 27 with no input signal applied to the amplifier so that the amplifier is in its quiescent state, and the resistance of gate element 24 is equal to the resistance of gate element 26. Thus, $i_{2/2}$ is the bias current in each control element when the amplifier is in the quiescent state. The operating point of the amplifier is determined by the magnitude of the field applied to the gate element, which field is in turn controlled by the current delivered by constant current source 20, and any tendency of the operating point to shift in either of the gate conductors is corrected by the inherent self-balancing feature which causes equal resistance to be maintained in each path, when identical gate elements are employed, and approximately equal resistance when disimilar gate elements are used.

The signal to be amplified is applied to terminals 28 and 29 and the signal current flows through a pair of signal control coils: the first, 30, is associated with gate element 24 and the second, 31, is associated with gate element 26. The relationship between the signal control coils 30 and 31 and the bias control coils 25 and 27 is such that, depending on the direction of signal current flow, a first signal control coil produces a field which adds to the field produced by a first bias control coil and a second signal control coil produces a field which subtracts from the field produced by a second bias control coil. In order to better understand the operation of this feature of the invention, assume a current $i_1$, at a particular instant in time, to be flowing from terminal 29 to terminal 28, as shown in FIG. 2. This current, $i_1$ in control coil 30 produces a magnetic field which is applied to gate element 24 and, from the direction of current flow assumed, this field adds to the field produced by control coil 25. The resultant field operating on gate element 24 is, therefore, the sum of the fields produced by control coils 25 and 30. Additionally, the current $i_1$ in control element 31 produces a magnetic field which is applied to gate element 26, but the field produced by control coil 31 is opposite to that generated by control coil 27. The resultant field operating on gate element 26 is, therefore, the difference of the fields produced by control coils 27 and 31. In this manner, current in the signal control coils 30 and 31 produce fields which cause the resistance of one gate element to increase and that of the second gate element to decrease. The current $i_2$, from constant current source 20, which, in the absence of signal current $i_1$ is divided equally between gate elements 24 and 26 as hereinabove explained, now divides as a function of the new resistance of the gate elements, that, gate element 26 conducts a current greater than that conducted by gate element 24. This change in resistance of the gate elements produces a current shift from one gate element to the other, the magnitude of which is a function of the signal current $i_1$.

This current shift affects the bias field applied to each gate element in such a manner that the bias field tends to counteract the magnetic field generated by $i_1$ flowing in control coils 30 and 31. Continuing the above example, the field generated by $i_1$ flowing in control coil 30 causes gate element 24 to become more resistive thereby reducing the current conducted by gate element 24. This reduced current, which necessarily flows through control coil 25, reduces the bias field applied to gate element 24. Thus, the resultant field is not the sum of the signal field and original bias field but rather the sum of the signal field and a reduced bias field. In a similar manner, the resultant field applied to gate element 26 is less than the difference between the signal field and original bias fields. The field generated to $i_1$ flowing in control coil 31 effectively cancels a portion of the bias field, allowing gate element 26 to be less resistive and thereby conducting an increased current. This increased current flowing through control coil 27 adds to the original bias field thereby restoring some of that portion of the bias field cancelled by the signal field.

This action may be further understood by means of FIG. 3*a* and FIG. 3*b* which illustrate the operation of the amplifier of the invention. FIG. 3*a* is a curve showing the current conducted by gate element 24 as a function of signal current, and FIG. 3*b* is a similar curve for gate element 26. Initially, with no signal applied to the amplifier, each of the gate elements is conducting a current equal to $i_{2/2}$ and indicated as points 40 and 50. In the following analysis, a positive sign is used to indicate that the signal current flows from terminal 29 towards terminal 28, as shown in FIG. 2. A negative sign is used to indicate that the signal current flows in the opposite direction, that is, from terminal 28 towards terminal 29. A current $+i_1$ having a value such that, when flowing in control coil 30 it produces a field, which when added to the original bias field, is sufficient to cause gate element 24 to be fully resistive as shown at 41 in FIG. 3*a*. Additionally, this current, when flowing in control coil 31 generates a magnetic field sufficient, in combination with the original bias field, to cause gate element 26 to be fully superconductive, as shown at 51 in FIG. 3*b*. As the resistance of gate element 24 is increased, the current therethrough is correspondingly decreased thereby decreasing the original bias field, resulting in the current indicated at 42, being conducted by gate 24 rather than the expected value of zero. Likewise, the increase of current through gate element 26 and control element 27 increases the original bias field, thereby reducing the current from the expected value of $i_2$ to that shown as 52. In a similar manner, if the current flows in the opposite direction, $-i_1$, so that the field generated by control element 25 is opposed and that generated by control element 27 is aided, then, instead of the expected values of $i_2$ and zero, respectively, being obtained as shown at 43 and 53, the values of the current obtained is that shown at 44 and 54.

The novel self-biasing feature of the invention results in a more linear amplifier, as shown in FIG. 3*a* and FIG. 3*b*, accommodating a wider input signal range, and having reduced gain as shown by the slopes of curves 44—42 and 54—52 being less than that of the curves 43—41 and 53—51, respectively. In general, the self-biasing feature results in many of the characteristics obtained by means of negative feedback when applied to electronic amplifiers. Additionally, the negative feedback connection results in the gain being less dependent on the parameters of the gate element material.

FIG. 4 illustrates a multi-stage amplifier of the invention wherein the first stage includes the circuit of FIG. 2 with the same reference numerals applied to similar components. With no input signal, constant current source 20 delivers a current $i_2$ to junction 21. From this junction, a current $i_{2/2}$ flows through gate element 24 and control coil 25, and a current $i_{2/2}$ flows through gate element 26 and control coil 27 as hereinbefore described. As shown in FIG. 4 these currents are applied to the input control coils of a second identical stage, whereby the current conducted by gate element 24 flows through control coils 60 and 61, while the current conducted by gate element 26 flows through control coils 62 and 63. Control coils 60 and 62 as well as 61 and 63 are oppositely magnetically coupled so that no effective magnetic field is developed, when the current in control coils 60 and 61 is equal to the current in control coils 62 and 63 as is more particularly hereinafter described. As can be seen in FIG. 4 a first gate element 64, similar to the hereinbefore described gate element 24, is effected by the fields produced by a pair of signal control coils 60 and 62, as well as the field produced by the self-bias control coil 65. The field generated by control coil 60 is opposed to the field generated by control coil 62, and since each of these fields are equal and opposite, no effective field is applied to gate element 64 by these control coils when there is no input signal applied to the amplifier. For the same reason, no effective field is applied to gate element 66 in the absence of an input signal. The field generated by control coil 61 cancels the field generated by control coil 63, since the direction of current flow through each of these control coils is opposite one to another. Thus, even though the total bias current $i_2$ of the previous stage is flowing through the input control coils of the second stage, this current does not apply an effective magnetic field to the gate elements of the second stage. Thus, the two currents, each having the value $i_{2/2}$ in the absence of an input signal combine at terminal 67 to yield a value of current equal to $i_2$, which then flows to junction 68. This current $i_2$ then again divides into two currents, and as will be understood, from the analysis of the circuit of FIG. 2, with no signal current flowing between input terminals 28 and 29, each of these two currents again has the value $i_{2/2}$ with the first flowing through gate element 64 and the self-bias control coil 65, and the second flowing through gate element 66 and a self bias control coil 69. Control coils 70 and 71 as well as control coils 72 and 73 represent the input elements of a third similar amplifier, cryogenic flip-flop, electronic device, or the like, and these input elements function in the same manner as input coils 60—61 and 62—63. As will be understood by one skilled in the art, control coils 60 and 62 as well as 61 and 63 may be wound in bifilar fashion in order that equal and opposite magnetic fields are generated when equal currents flow in these coils.

Although input control coils 60—61, 62—63, and 70—71, 72—73, etc., generate no effective magnetic field as applied to gate elements 64, 66, etc., when no signal is applied to the input terminals 29 and 28, the application of a signal current to these input terminals results in a magnetic field being applied to gate elements 64, 66, etc., by these control coils. In this manner, each stage of the multi-stage amplifier provides additional amplification to the applied signal. Again assume, a signal current flowing from terminal 29 towards terminal 28, so that gate element 24 is caused to become more resistive than gate element 26, whereby more current is caused to flow through gate element 26, and thereby through control coils 62 and 63, and less current is caused to flow through control coils 60 and 61. This increased current in control coil 63 produces a magnetic field which aids the self-bias field of control coil 69. At the same time the decreased current in control coil 61 reduces the magnetic field produced thereby. In this manner, control coils 63 and 61 generate a net field which adds to the self-bias field thereby increasing the resistance of gate element 66. Similarly, the increased current in control coil 62 produces a magnetic field which oppose the self-bias field of control coil 65. At the same time, the increased current in control coil 60 reduces the magnetic field produced thereby. In this manner, control coils 62 and 60 generate a net field which opposes the self-bias field thereby decreasing the resistance of gate element 64. Therefore, the action of a signal current, flowing between 29 and 28, on the second stage of the amplifier of the invention can be briefly summarized as follows. A signal current flowing from terminal 29 towards terminal 28 results in gate element 26 conducting a current which is greater and gate element 24 conducting a current which is less than the current therethrough in the absence of the signal current. The excess current through gate element 26 flows through control elements 62 and 63, and in conjunction with the simultaneous reduction of current through gate element 24 and control elements 60 and 61, causes the resistance of gate element 66 to be increased and the resistance of gate 64 to be decreased. It can be seen, therefore, that in the schematic diagram of a multi-stage amplifier, as shown, the lower resistance gate element alternates from one side to the other in each succeeding stage.

For reasons of clarity, the control elements have been illustrated in the drawings as coils, but it should be understood that thin film cryogenic devices of the type described in copending application, Serial No. 625,512, filed November 30, 1956, on behalf of Richard L. Garwin, and assigned to the assignee of this invention, may be employed as a means of self-biasing the gate elements in the amplifier embodiment of the invention as well as providing the necessary circuit means for connecting a first cryogenic amplifier stage in cascade with a second cryogenic amplifier stage in such a way that no effective magnetic field is applied to the input of the second stage due to current used to bias the first stage in the absence of an applied input signal.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A multi-stage cryogenic amplifier comprising a plurality of amplifier stages, means maintaining each of said stages at a superconductive temperature; each of said stages including first and second current paths, a terminal, and means connecting said first and second paths in parallel circuit relationship with said terminal; a current source; means connecting said source in series with said plurality of stages; all of said paths including means responsive to current flow therethrough tending to maintain the resistance of each of said first and second paths equal one to another; and circuit means coupling each succeeding stage to each preceding stage including first magnetic means electrically connected in series with said first path of said preceding stage and said terminal of said succeeding stage for magnetically modifying the resistance of said first and second paths of said succeeding stage, second magnetic means electrically connected in series with said second path of said preceding stage and said terminal of said succeeding stage for magnetically modifying the resistance of said first and second paths of said succeeding stage, said first and second magnetic means magnetically coupled and orientated in fixed relationship whereby the magnetic field generated by said first magnetic means is opposed to the magnetic field generated by said second magnetic means.

2. A multi-stage cryogenic amplifier comprising; a plurality of cryogenic amplifier stages operated at a superconductive temperature, each of said stages including first and second gate elements electrically connected in parallel; a source of bias current; means connecting said source electrically in series with said stages; and circuit means tending to cancel the magnetic field generated by the bias current of a preceding stage flowing in the input of a succeeding stage including first and second bifilar coils for applying magnetic fields to said first and second gate elements, respectively, of said succeeding stage, means connecting a first winding of said first bifilar coil electrically in series with a first winding of said second bifilar coil to form a first current path, means connecting a second winding of said bifilar coil electrically in series with a second winding of said second bifilar coil to form a second current path, means to conduct current from said first gate element of said preceding stage in a first direction through said first path, and means to conduct current from said second gate element of said preceding stage in a second direction through said second path whereby the magnetic field generated by the current in said first path is opposite and equal to the magnetic field generated by the current in said second path only when said currents are equal.

3. A multi-stage cryogenic amplifier operated at a superconductive temperature comprising; a plurality of amplifier stages, each of said stages including a pair of gate elements of superconductive material electrically connected in parallel, and self-biasing means for each of said gate elements whereby each of said gate elements has a predetermined resistance value, said resistance value being greater than zero but less than the normal resistance value of said superconductive material; and means connecting a preceding amplifier stage to a succeeding amplifier stage including a first pair of control elements of superconductive material for applying a magnetic field to a first gate element of said succeeding stage, a second pair of control elements of superconductive material for applying a magnetic field to a second gate element of said succeeding stage, means connecting a first control element of each of said first and second pairs of control elements electrically in series, means connecting a second control element of each of said first and second pairs of control elements electrically in series, and means to conduct a portion of the current from said preceding stage through each of said serially connected control elements of said succeeding stage whereby the magnetic field generated by equal currents in each of said serially connected control elements cancel.

4. A multi-stage cryogenic amplifier operated at a superconductive temperature comprising; a plurality of cryogenic amplifier stages, each of said stages including a pair of superconductive gate elements electrically connected in parallel and circuit means responsive to current conducted by said gate elements tending to maintain the resistance of said gate elements equal one to another, said circuit means including a pair of superconductive control elements, one associated with each of said gate elements to magnetically modify the resistance thereof, means connecting a first of said pair of control elements electrically in series with a first of said gate elements, and means connecting a second of said pair of control elements electrically in series with a second gate element; and means tending to cancel the magnetic field generated by current from a preceding stage flowing in the input of a succeeding stage including, third, fourth, fifth, and sixth superconductive control elements, said third and fifth control elements oppositely magnetically coupled and associated with said first gate element of said succeeding stage to magnetically modify the resistance thereof, said fourth and sixth control elements oppositely magnetically coupled and associated with said second gate element of said succeeding stage to magnetically modify the resistance thereof, means to connect said third and fourth control elements electrically in series with said first control element of said preceding stage and said parallel operated pair of gate elements of said succeeding stage, and means to connect said fifth and sixth control elements electrically in series with said second control element of said preceding stage and said pair of parallel operated gate elements of said succeeding stage.

5. A cryogenic amplifier circuit comprising; first and second amplifier stages; said first stage including first and second superconductive paths connected in parallel circuit relationship; said second stage including third and fourth superconductive paths connected in parallel circuit relationship; a source of electrical current connected in series with said first and second stages for supplying a predetermined current thereto; each of said paths including a gate element and a control element; said control element being arranged in magnetic field applying relationship to said gate element; each of said control elements being effective in response to a predetermined portion of said current from said source to bias its associated gate element at a predetermined resistance value so that said current from said source normally divides in predetermined portions between said first and second paths in said first stage and said third and fourth paths in said second stage; means connected in said first stage of said amplifier for applying input signals to said second stage of said amplifier; said last named means including first and second control element means, said first control element means connected in said first path of said first stage and arranged in magnetic field applying relationship to said gate elements in each of said third and fourth paths of said second stage for applying magnetic fields in a first direction to each of said gate elements, said second control element means connected in said second path of said first stage and arranged in magnetic field applying relationship to said gate elements in each of said third and fourth paths of said second stage for applying magnetic fields in a second direction to each of said gate elements; means maintaining said amplifier circuit at a temperature at which each of said gate and control elements is normally superconducting and signal means arranged in magnetic field applying relationship to said gate elements in each of said first and second paths of said first stage.

6. A superconductive amplifier comprising; first and second superconductive gate elements; a source of constant current; a first terminal; means connecting said source to said first terminal; means connecting said first and second gate elements to said terminal whereby said gate elements are electrically connected in parallel to said terminal; first and second control elements; means connecting said first and second control elements in series with said first and second gate elements, respectively, said first control element adopted to bias said first gate element and said second control element adopted to bias said second gate element each in the transition region between the superconducting and resistive state; a utilization device; means coupling siad utilization device between said first and second control elements; third and fourth control elements; said third control element adopted to control the resistance of said first gate element and said fourth element adopted to control the resistance of said second gate element; a signal current source; means connecting said signal source and said third and fourth control elements electrically in series; and means maintaining said amplifier at a superconductive temperature at which each of said gate and control elements is normally superconducting; said utilization device comprising third and fourth superconductive gate elements, fifth and sixth control elements, a second terminal, means connecting said fifth and sixth control element electrically in series between said first control element and said second terminal, seventh and eight control elements, and means connecting said seventh and eighth control elements electrically in series between said second control element and said second terminal, whereby said fifth and eighth control elements control the resistance of said third gate element and said sixth and seventh control elements control the resistance of said fourth gate element.

7. A self biasing cryogenic amplifier comprising; a current source; first and second superconductive current paths electrically connected in parallel across said source; each of said paths including a superconductive gate element; means maintaining said amplifier at a temperature at which each of said gate elements is normally superconducting; said current source supplying a predetermined current to said parallel connected current paths; a first portion of said predetermined current when in said first path being of itself effective to cause the gate element in said first path to exhibit a predetermined resistance value; the remaining portion of said predetermined current when in said second path being of itself effective to cause the gate element in said second path to exhibit said predetermined resistance, whereby the predetermined current from said source normally divides between said first and second paths with said first portion thereof in said first path and said remaining portion thereof in said second path; signal means arranged adjacent said paths for simultaneously increasing the resistance of one of said gate elements and decreasing the resistance of the other of said gate elements; and output means comprising; third and fourth superconductive gate elements; first and second superconductive control elements; said first control element electrically connected in series with said first path and arranged in magnetic field applying relationship to said third and fourth gate elements; said second control element electrically connected in series with said second path and arranged in magnetic field applying relationship to said third and fourth gate elements; whereby, when said current from said source divides with said first portion in said first path and said remaining portion in said second path, the fields generated by said first and second control elements and applied to said third and fourth gate elements cancel each other.

8. A superconducitve amplifier comprising a plurality of superconductive amplifier stages; a single source of constant current; means connecting said single current source electrically in series with all of said amplifier stages; each of said stages including first and second superconductive gate elements electrically connected in parallel; first and second control elements associated with said first and second gate elements, respectively, for magnetically modifying the resistance thereof, means connecting said first gate element and said first control element electrically in series, means connecting said second gate element and said second control element elecrically in series; means maintaining all of said amplifier stages at a superconductive temperature such that all of said gate elements are normally superconducting; circuit means connecting each preceding stage to each succeeding stage including third, fourth, fifth, and sixth control elements, said third and fifth control elements oppositely magnetically coupled and associated with said first gate element of said succeeding stage, said fourth and sixth control elements oppositely magnetically coupled and associated with said second gate element of said succeeding stage, means connecting said third and fourth control elements electrically in series with said first control element of said preceding stage and said parallel operated first and second gate elements of said succeeding stage, and means connecting said fifth and sixth control elements electrically in series with said second control element of said preceding stage and said parallel operated first and second gate elements of said succeeding stage, said third and fifth control elements and said fourth and sixth control elements each being bifilarly wound.

9. A superconductive amplifier comprising first and second superconductive amplifier stages, means maintaining said first and second stages at a superconductive temperature; a source of constant current; means connected said source electrically in series with said first and second stages; said first amplifier stage including first and second superconductive parallel paths; said second stage including third and fourth superconductive parallel paths; each of said paths including a superconductive gate element; and means coupled to the first stage of said amplifier for applying signals to said second stage of said amplifier including first and second control element means; said first control element means connected in said first path of said first stage and arranged in magnetic field applying relationship to said gate elements in each of said third and fourth paths of said second stage for applying magnetic fields thereto, said second control means connected in said second path of said first stage and arranged in magnetic field applying relationship to said gate elements in each of said third and fourth paths of said second stage for applying magnetic fields thereto, whereby the magneitc fields generating by said first control element means oppose the magnetic fields generated by said second control element means.

References Cited in the file of this patent

UNITED STATES PATENTS

| | | |
|---|---|---|
| 2,832,897 | Buck | Apr. 29, 1958 |
| 2,935,694 | Schmitt et al. | May 3, 1960 |

OTHER REFERENCES

Buck: Proceedings of the IRE, April 1956, pages 482–493.

Slade et al.: National Electronics Conference, vol. 13, Oct. 7–9, 1957, pages 574–582.